United States Patent
Hirooka

(10) Patent No.: US 7,634,348 B2
(45) Date of Patent: Dec. 15, 2009

(54) EJECTOR SYSTEM FOR A VEHICLE AND EJECTOR SYSTEM CONTROLLER

(75) Inventor: Shigemasa Hirooka, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 11/921,231

(22) PCT Filed: Feb. 13, 2007

(86) PCT No.: PCT/IB2007/000784

§ 371 (c)(1),
(2), (4) Date: Nov. 29, 2007

(87) PCT Pub. No.: WO2007/093917

PCT Pub. Date: Aug. 23, 2007

(65) Prior Publication Data

US 2009/0132149 A1    May 21, 2009

(30) Foreign Application Priority Data

Feb. 14, 2006    (JP) .............................. 2006-037291

(51) Int. Cl.
*F02D 45/00*    (2006.01)
*B60T 17/00*    (2006.01)

(52) U.S. Cl. ...................................... 701/103

(58) Field of Classification Search ................. 701/103, 701/102; 123/321, 320, 198 F; 60/397
See application file for complete search history.

(56) References Cited

U.S. PATENT DOCUMENTS

| 3,824,792 A | 7/1974 | Grabb et al. |
| 6,220,271 B1 | 4/2001 | Emmerich et al. |
| 6,625,981 B2 * | 9/2003 | Ikeda et al. ................... 60/397 |
| 2007/0236083 A1 * | 10/2007 | Kawamori et al. ....... 303/114.3 |

FOREIGN PATENT DOCUMENTS

DE    198 42 751    3/2000

(Continued)

OTHER PUBLICATIONS

International Search Report.

(Continued)

*Primary Examiner*—Hieu T Vo
(74) *Attorney, Agent, or Firm*—Finnegan, Henderson, Farabow, Garrett & Dunner, LLP

(57) ABSTRACT

A vehicle ejector system (100A) has an in-flow port (31a) and an out-flow port (31b) connected in the intake passage of an intake system (10) of an internal combustion engine (50), which provides communication between the atmosphere and each cylinder of the internal combustion engine, so as to include a throttle valve (13a) between the in-flow port (31a) and the out-flow port (31b). The ejector system (100A) also includes an ejector (30) that supplies negative pressure generated by the intake air passing between in-flow port (31a) and the out-flow port (31b) to a brake booster (22), a VSV (1) that allows the ejector (30) to operate and stop, and an ECU (40A) that controls the VSV (1), wherein in the combustion cycle of the internal combustion engine (50) the ECU (40A) controls the VSV (1) to operate the ejector (30).

17 Claims, 5 Drawing Sheets

EJECTOR SYSTEM 100A : 1,13,30,40A

FOREIGN PATENT DOCUMENTS

| | | |
|---|---|---|
| DE | 10 2004 061 845 | 7/2005 |
| JP | 07-42566 | 2/1995 |
| JP | 2004-19552 A * | 1/2004 |
| JP | 2004-299567 | 10/2004 |
| JP | 2005-69175 | 3/2005 |
| JP | 2005-263107 | 9/2005 |

OTHER PUBLICATIONS

Written Opinion of the ISA.
Japanese Office Action dated Feb. 3, 2009.

* cited by examiner

EJECTOR SYSTEM 100A : 1,13,30,40A

EJECTOR SYSTEM FOR A VEHICLE AND EJECTOR SYSTEM CONTROLLER

BACKGROUND OF THE INVENTION

1. Field of the Invention

The present invention relates to an ejector system for a vehicle and an ejector system controller, and more particularly to an ejector system for a vehicle having an ejector supplying a negative pressure to brake booster and an ejector system controller.

2. Description of the Related Art

In a conventional vehicle, in order to supply a brake booster with negative pressure that is greater than the negative pressure that is to be applied from an intake passage of the intake system, which provides communication between the atmosphere and each cylinder of an internal combustion engine, an ejector was used. The following vehicle controller has been described with regard to this ejector, for example in Japanese Patent Application Publication No. JP-A-2005-69175. In the vehicle controller, because the amount of intake air changes when the ejector operates, it is not possible to maintain a proper air-fuel ratio when idling. In consideration of this unstable idling, operation of the ejector is prohibited for a prescribed period of time after the internal combustion engine is started in order to establish stable idling and the proper air-fuel ratio in particular immediately after the engine is started.

The following negative pressure generating apparatus is described, for example, in Japanese Patent Application Publication No. JP-A-2004-299567. The negative pressure generating apparatus allows all of the intake air to flow into the ejector when the throttle valve is fully open, and further has a valve body that changes the cross-sectional area of the ejector nozzle and diffuser to adjust the intake air amount by controlling the valve body. According to the negative pressure generating apparatus described in JP-A-2004-299567, it is possible to prevent unstable idling even if the ejector is actuated, the result of which is that it is possible to perform proper intake control and possible to obtain a high negative pressure.

In recent years, environmental issues such as global warming and atmospheric pollution have gained more and more attention, making it an important issue to reduce emissions such as hydrocarbons included in vehicular exhaust gas. Quickly raising the temperature of a catalyst installed in an exhaust system of an internal combustion engine to the catalyst reaction temperature is one effective approach. For this reason, the ignition timing of the internal combustion engine is generally retarded after the internal combustion engine is started until the catalyst is activated. Simultaneously, the throttle valve is controlled so that the intake passage is increased, thereby increasing the intake air amount, which compensates for a decrease in torque (the control is hereinafter referred to as "catalyst warm-up control"). By performing the catalyst warm-up control, because it is possible to combust more gas mixture closer to the timing of the exhaust stroke, the catalyst may be quickly brought to the reaction temperature.

However, if the throttle valve is used to increase the intake passage as described above, the negative pressure generated in the internal combustion engine is reduced. In this case, because the brake booster is applying negative pressure from the intake system of the internal combustion engine, the brake assist function becomes insufficient, resulting in an increase in the operating load placed on the vehicle operator. For this reason, under the catalyst warm-up control as described above, an ejector is generally used to supply a greater negative pressure to the brake booster, in which case because the intake passage is opened relatively widely, there is a relative decrease in the degree of variation in the air intake amount even if the ejector is caused to function. For this reason, in contrast to the problem envisioned in the art proposed in JP-A-2005-69175 and JP-A2004-299567, there is no great loss of idling stability.

On the other hand, when the coolant temperature of the internal combustion engine reaches or exceeds a prescribed temperature and the catalyst is activated, there is no need to perform catalyst warm-up control. In this case, in order to lower the target rpm idling speed for improving fuel economy, the opening of the throttle valve is appropriately reduced. However, if the ejector is caused to function in this case, the air-fuel ratio is affected. This makes it difficult to control the target idling rpm speed, which could result in unstable idling. Although the simplest solution for this is to not cause the ejector to function, this results in the following problems. Because the structure of an ejector is one in which a large negative pressure is generated by the venturi effect, the passage corresponding to the part of the ejector in which the large negative pressure is generated is narrowed. If the ejector is not operated for a long period of time, because the intake air does not pass through the ejector, the passage tends to become blocked. The blockage may be caused by, for example, moisture contained in the intake air is condensed and then accumulated in the passage, and it can freeze in winter, intake air containing oil intrudes into the ejector to become attached the wall surfaces of the passage, and further joins with dust at the wall surfaces. As a result, it becomes a deposit that gradually blocks the passage.

The blockage of the ejector can occur as long as there is a time when the ejector does not operate, for example even in the ejector to which the vehicle controller described in JP-A-2005-69175 is applied. However, JP-A-2005-69175 makes no particular mention with regard to this point. In contrast, in the negative pressure generating apparatus of JP-A-2004-299567, because idling may be controlled as the intake air is continuously allowed to flow through the ejector, it is possible to achieve stable idling while inhibiting the risk of blockage of the ejector due to such deposits as described above. The negative pressure generating apparatus of JP-A-2004-299567 has a characteristic structure. For this reason, in order to retrofit this negative pressure generating apparatus to a vehicle that has an ejector, it would be necessary not only to change the control, but also to replace the negative pressure generating apparatus and the already installed ejector, and change the control wiring and the controller, resulting in a great increase in cost.

SUMMARY OF THE INVENTION

The present invention relates to an ejector system and controller for a vehicle, that inhibits the blockage of the ejector and adverse influence on the air-fuel ratio even if there is a time when the ejector does not operate. The vehicle ejector system and controller may be incorporated at minimal additional cost.

According to a first aspect of the present invention an vehicle ejector system having an ejector that generates a negative pressure that is greater than the negative pressure to be applied from an air intake passage of the intake system, which provides communication between the atmosphere and each cylinder of the internal combustion engine, and that supplies the negative pressure to a brake booster, an operation state changing device that either causes the ejector to operate or stop, and a controller that controls the operation state changing device, wherein when fuel is not injected in a combustion cycle of the internal combustion engine, the controller controls the operation state changing device to operate the ejector. That is, in the present invention, when fuel is not injected in the combustion cycle of the internal combustion engine, which is regarded as no adverse effect on the air-fuel ratio, the ejector is operated. Thus, the ejector is not only operated according to its originally desired operation but also operated during other times. In accordance with this aspect, it is possible to increase the amount of time when the intake air flows through the ejector without adversely affecting the air-fuel ratio. Thus, it is possible to inhibit the blockage of the ejector even if there is a time when the ejector does not operate during operation of the internal combustion engine. According to the above-noted aspect, because there is only a change in the control, it is possible to inhibit the blockage of the ejector with a low cost.

In a second aspect of the present invention, the operation state changing device may be controlled to operate the ejector when a fuel cut control of the internal combustion engine is executed. If the ejector is operated when the fuel cut control is executed as in the above-noted aspect, it is possible to increase the amount of time when the intake air flows through the ejector.

In a third aspect of the present invention, the operation state changing device may be controlled to operate the ejector when the ignition switch is off and the internal combustion engine is rotating. That is, even after the ignition switch is set to off, because the internal combustion engine rotates for some time until it completely stops, it is possible, for example as in the above-noted aspect, to have intake air flow through the ejector. According to the above-noted aspect, it is possible after the internal combustion engine stops to inhibit the blockage of the ejector that can occur resulting from the freezing of condensed water accumulated in the narrowed passage, and to inhibit deposits generated and fixed on the walls of the passage to aggravate the blockage of the ejector.

In a fourth aspect of the present invention, when the internal combustion engine is mounted in a hybrid vehicle that uses an electric motor as well as the internal combustion engine as a drive power source, and the operation state changing device may be controlled to operate the ejector when the drive power source is switched from the internal combustion engine to the electric motor. For example, in a so-called hybrid vehicle as well, using the above-noted aspect it is possible to inhibit the blockage of the ejector.

A fifth aspect of the present invention is a controller used in an ejector system for a vehicle in the above-noted aspects.

According to this aspect, it is possible to provide a low-cost ejector system and a controller that inhibit the blockage of the ejector and adverse affect on the air-fuel ratio even if there is a time when the ejector is not operated.

BRIEF DESCRIPTIONS OF THE DRAWINGS

The foregoing and further objects, features, and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
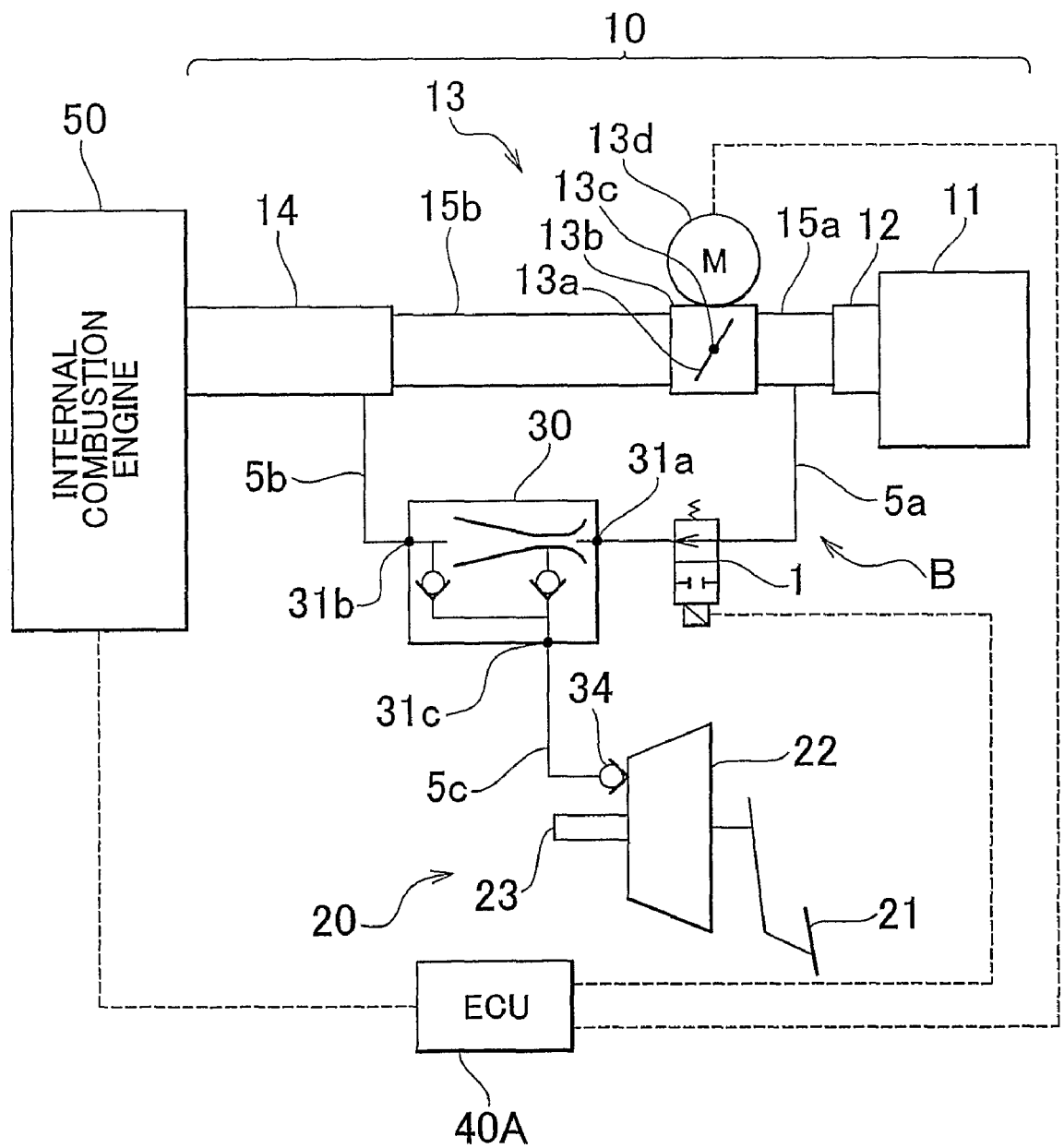
FIG. 1 shows in schematic form an ejector system according to a first embodiment of the present invention.

FIG. 1 is a schematic view of an ejector system 100A for a vehicle (hereinafter referred to simply as an ejector system) according to a first embodiment of the present invention. The constitutional elements shown in FIG. 1, including an internal combustion engine 50, are mounted in a vehicle (not illustrated). The air intake system 10 of the internal combustion engine 50 has an air cleaner 11, an air flow meter 12, an electric throttle 13, an intake manifold 14, intake ports (not illustrated) that communicate with cylinders (not illustrated) of the internal combustion engine 50, and air intake pipes 15a, 15b, for example, which are appropriately provided between these elements. The air cleaner 11 is configured to filter intake air supplied to each cylinder of the internal combustion engine 50, and is connected via an air duct (not illustrated) to the atmosphere. The air flow meter 12 is configured to measure the amount of intake air flow, and outputs a signal according to the intake air flow amount.

The electric throttle 13 has a throttle valve 13a, a throttle body 13b, a valve stem 13c, and an electric motor 13d. The throttle valve 13a is configured to adjust the overall amount of intake air supplied to each cylinder of the internal combustion engine 50 by changing the opening. The throttle body 13b is a cylindrical member formed in the intake passage, and pivotally supports the valve stem 13c of the throttle valve 13a provided in the intake passage. The electric motor 13d changes the opening of the throttle valve 13a according to control from an ECU (electronic control unit) 40A, and a stepping motor may be used as this electrical motor 13d. The electric motor 13d is fixed to the throttle body 13b, and the output shaft thereof (not illustrated) is linked to the valve stem 13c. The opening of the throttle valve 13a is detected at the ECU 40A based on an output signal from an encoder (not illustrated) housed within the electric throttle 13.

Although the throttle mechanism uses a throttle-by-wire system in which the throttle valve 13a such as in the electric throttle 13 is driven by an actuator, when the ejector 30 is operated, as described later, it is preferable that air-fuel ratio correction control be simultaneously performed. There is no restriction to this, however, and, for example, a mechanical throttle mechanism may be applied, in which the throttle may be linked to an accelerator pedal (not illustrated) via a wire or the like, in place of the electric throttle 13. The intake manifold 14 is configured to split a single upstream intake passage between each of the cylinders of the internal combustion engine 50 downstream, to distribute the intake air to each cylinder of the internal combustion engine 50.

The brake apparatus 20 has a brake pedal 21, a brake booster 22, a master cylinder 23, and wheel cylinders (not illustrated). The brake pedal 21, which is operated by the driver to brake the wheels, is linked to the input rod (not illustrated) of the brake booster 22. The brake booster 22 generates an assist force with a prescribed force ratio with respect to the pedal operation force. Within the brake booster 22, a negative pressure chamber (not illustrated) defined on the master cylinder 23 side is connected to the intake passage of the intake manifold 14 via the ejector 30. The output rod (not illustrated) of the brake booster 22 is further linked to the input shaft (not illustrated) of the master cylinder 23, which generates a hydraulic pressure responsive to the actuation force from the brake booster 22 that obtains an assist in addition to the pedal assist force. The master cylinder 23 is connected via a hydraulic circuit to each wheel cylinder provided in the disc brake mechanism (not illustrated) of each wheel, each wheel cylinder generating a braking force by hydraulic pressure supplied from the master cylinder 23. Providing that the brake booster 22 is an air-pressure type, it is not subjected to any particular restrictions, and may be a general-type brake booster.

The ejector 30 generates and supplies a large negative pressure to the negative pressure chamber of the brake booster 22. This negative pressure is even greater than the negative pressure applied from the intake system 10, or more specifically from the intake manifold 14. The ejector 30 has an in-flow port 31a, an out-flow port 31b, and a negative pressure supplying port 31c, which is connected to the negative pressure chamber of the brake booster 22 by an air hose 5c. The in-flow port 31a communicates with the intake passage of the intake pipe 15a by the air hose 5a and the out-flow port 31b communicates with the intake passage of the intake manifold 14 by the air hose 5b, so that the electric throttle 13 or, specifically, the throttle valve 13a, is located downstream of the connection of the air hose 5a to the intake pipe 15a and upstream of the connection of the air hose 5b to the intake manifold 14. By doing this, a bypass B that bypasses the electric throttle 13 is formed by the ejector 30 and the air hoses 5a, 5b. When the ejector 30 is not operated, negative pressure is supplied from the intake passage of the intake manifold 14 to the negative pressure chamber of the brake booster 22, via the air hose 5b, the out-flow port 31b and negative pressure supplying port 31c of the ejector 30, and the air hose 5c.

A vacuum switching valve (VSV) 1 is provided midway in the air hose 5a. The VSV 1 connects and blocks the bypass B under control of the ECU 40A and, in this embodiment, is a normally closed two-position/two-port solenoid valve. The VSV 1, however, is not restricted in to this and may be a different type of electromagnetic valve, and further may be a flow amount adjustment valve or the like, which enables control of the degree of blockage of the flow path. The VSV 1 switches the ejector 30 to operate or stop, by connecting or blocking the bypass B. Thus, the VSV 1 of this embodiment may be regarded as the operation state changing device of the present invention.

Figure 2:
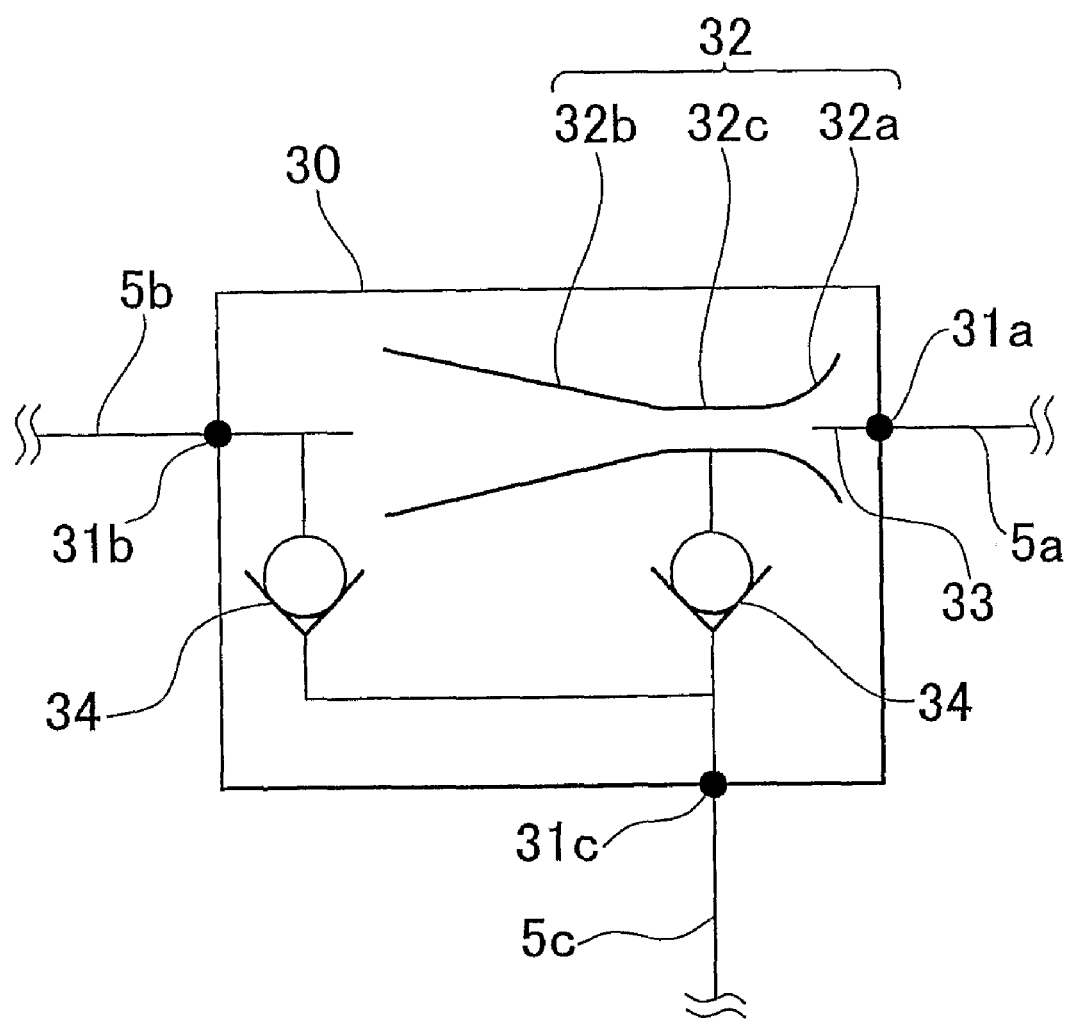
FIG. 2 shows in schematic form the internal structure of an ejector.

FIG. 2 shows, in schematic form, the internal configuration of the ejector 30, which has an internal diffuser 32. The diffuser 32 is formed by a tapered-down part 32a, a tapered-up part 32b, and a negative pressure generating part 32c forming a passage connecting the tapered-down part 32a and the tapered-up part 32b. The tapered-down part 32a is opened to oppose the in-flow port 31a and the tapered-up part 32b is opened to oppose the out-flow port 31b. The negative pressure generating part 32c communicates with the negative pressure supplying port 31c. A nozzle 33 injecting air toward the tapered-down part 32a is provided at the in-flow port 31a, and intake air injected from the nozzle 33 passes through the diffuser 32 and flows further out from the out-flow port 31b to the air hose 5b. When this occurs, by the occurrence of a high-speed injection flow, a large negative pressure is generated in the negative pressure generating part 32c by the venturi effect, and this negative pressure is further supplied from the negative pressure supplying port 31c to the negative pressure chamber, via the air hose 5c. By the operation of the ejector 30, the brake booster 22 can obtain a negative pressure that is larger than the pressure applied directly from the intake manifold 14. The check valves 34 provided in the internal flow passage between the negative pressure generating part 32c and the negative pressure supplying port 31c, in the internal flow passage between the out-flow port 31b and the negative pressure supplying port 31c, and at the connecting portion of the brake booster 22 to the air hose 5c are each provided to prevent reverse flow. The ejector 30 is not restricted to the internal construction shown in FIG. 2, and it is possible to apply an ejector having a different internal construction in place of the ejector 30.

The ECU 40A has a central processing unit CPU (not shown), a read-only memory (ROM), a random-access memory (RAM), and an input/output circuit. The ECU 40A is configured mainly to control the internal combustion engine 50, and in this embodiment controls the VSV 1 as well. The ROM is configured to store a program describing various processing executed by the CPU, and in this embodiment stores a program for VSV 1 control in addition to a program for controlling the internal combustion engine 50. However, these programs may be combined as one. The ECU 40A, in addition to being connected to the VSV 1 and electric throttle 13, is connected to various controlled devices and various sensors. In this embodiment, the VSV 1, the ejector 30, and the ECU 40A function as the ejector system 100A.

Next, the following will describe in detail how blockage of the ejector 30 occurs. In the internal structure of the ejector 30 shown in FIG. 2, the negative pressure generating part 32c is narrowed to a small size. For this reason, when oil becomes attached to the wall surfaces of the negative pressure generating part 32c, this oil joins with dust and the like when the ejector 30 is stopped, thereby causing deposits to form. If the ejector 30 is not operated for a long period of time, the generated deposits become fixed to the wall surfaces of the negative pressure generating part 32c. Additionally, repeated accumulation of the deposits will gradually block the negative pressure generating part 32c, resulting in blockage of the ejector 30. While the ejector 30 is stopped, it is also possible for condensed water in the negative pressure generating part 32c to accumulate. In this case, if the internal combustion engine 50 is stopped in this condition, in the winter the condensed water can freeze to block the negative pressure generating part 32c, resulting in blockage of the ejector 30. In contrast, the ejector system 100A of this embodiment inhibits blockage by performing the control described below.

Figure 3:
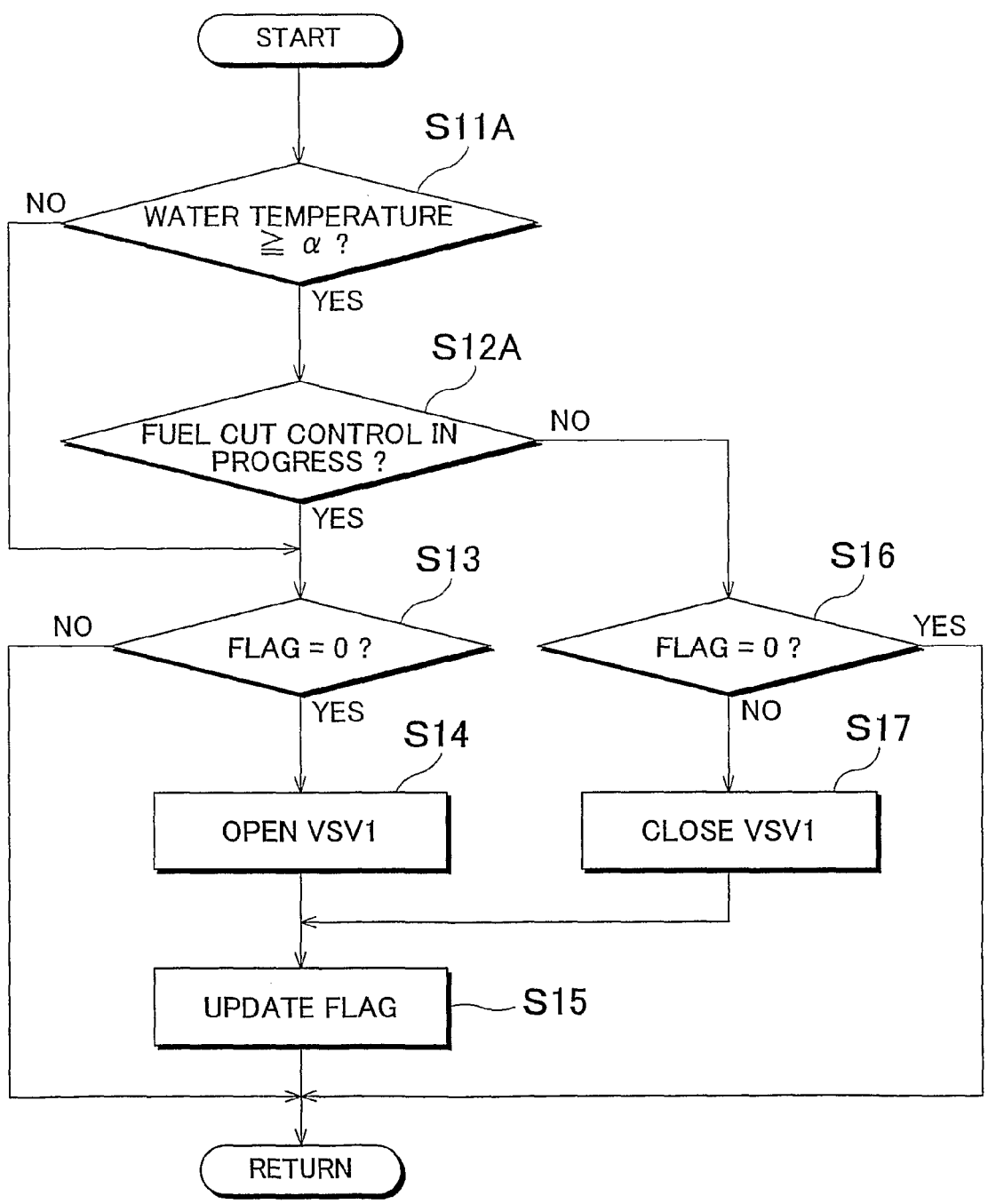
FIG. 3 is a flowchart of the processes performed in ECU 40A in causing ejector to operate, based on an operating state of an internal combustion engine.

FIG. 3 is a flowchart showing the process performed by the ECU 40A in operating the ejector 30, based on the operating state of the internal combustion engine 50. The ECU 40A, based on a program for controlling the VSV 1 stored in the ROM, controls the VSV 1 so that the CPU repeatedly executes the processing indicated in the flowchart in an extremely short time. The CPU determines whether the coolant temperature in the internal combustion engine 50 is at or greater than a prescribed value a (step 11A). The prescribed value a is the temperature at which the warm-up control stops, and in this embodiment, this is set to a value that is an appropriate coolant temperature (for example 70° C.). In this step, it is determined whether the catalyst is activated. If the determination is affirmative, the CPU then determines whether fuel cut control is being performed in the internal combustion engine 50 (step 12A). Whether fuel cut control is being performed is determined through verification by the CPU of an internal processing state related to fuel injection control performed by the ECU 40A.

If an affirmative determination is made at step 12A, the CPU then determines whether the flag is 0 (step 13). The default state of the flag is 0, which indicates that the VSV 1 is closed. If the flag is 0, the CPU sends signals to electrically power the VSV 1, to open the VSV 1 (step 14). After that, the CPU executes updates the flag to 1, which indicates that the VSV 1 is open. By doing this, it is possible to operate the ejector 30 during fuel cut control, and to increase the amount of time when the intake air flows through the ejector 30. Because the ejector 30 is operated during fuel cut control, it is possible to allow the intake air to flow through the ejector 30 without adversely affecting the air-fuel ratio.

If a negative determination is made at step 12A, the CPU then determines whether the flag is 0 (step 16). If the flag is 1, because the VSV 1 is open regardless of whether or not fuel cut control is being performed, the CPU sends a signal to close the VSV 1 (step 17). By doing this, it is possible to avoid adversely affecting the air-fuel ratio. In this case, the CPU updates the flag to 0 at step 15. At step 11A, described above, even if a negative determination is made, the CPU then determines whether the flag is 0. If the flag is 0, because the VSV 1 is closed regardless of the coolant temperature being lower than the prescribed value a, the CPU sends a signal to open the VSV 1 (step 14). That is, in the case in which the coolant temperature is below the prescribed value a, in order to perform catalyst warm-up control the ejector 30 is operated to supply the brake booster 22 with a negative pressure that is greater than the negative pressure applied from the intake manifold 14.

In this manner, according to the ejector system 100A of this embodiment, by changing only the control of the already installed VSV 1, it is possible inhibit the blockage of the ejector 30 at low cost. While this embodiment was described in detail for the case of performing catalyst warm-up control, it is possible to inhibit blockage of the ejector 30 by allowing the ejector 30 to operate during feedback control even when, for example, catalyst warm-up control is not performed. In this case, process indicated by step 11A may be eliminated from the VSV 1 control program. By the above, even if there is a time when the ejector 30 is not operated, it is possible to realize an ejector system 100A and an ECU 40A that inhibit blockage of the ejector 30 at low cost and without adversely affecting the air-fuel ratio.

The ejector system 100B according to a second embodiment of the present invention is the same as the ejector system 100A of the first embodiment, with the exception of having an ECU 40B in place of the ECU 40A. The ECU 40B is the same as the ECU 40A, with the exception that a different VSV 1 control program is stored in the ROM. The various constituent elements of a vehicle into which the ejector system 100B is applied, with the exception of the ECU 40A, are the same as shown in FIG. 1. In this case, for example, when the vehicle is driven from the main roads into a residential area and parked in a garage, the vehicle may be driven at a low speed in the residential area for some time before being parked. However, fuel cut control is generally performed only when the accelerator pedal is released at a high rpm speed. For this reason, in the ejector system 100A of the first embodiment, in which the ejector 30 is operated during this period in response to fuel cut control, it is not possible to operate the ejector 30. Therefore, it can be envisioned that, during this period, condensed water accumulates or deposits occur in the negative pressure generating part 32c. Furthermore, if the internal combustion engine 50 is left in a garage for a long time, in the winter freezing of condensed water or caking of deposits that have occurred can aggravate the blockage of the ejector 30. To avoid the above situation, the ejector system 100B according to this embodiment inhibits the blockage by performing the following control using the ECU 40B.

Figure 4:
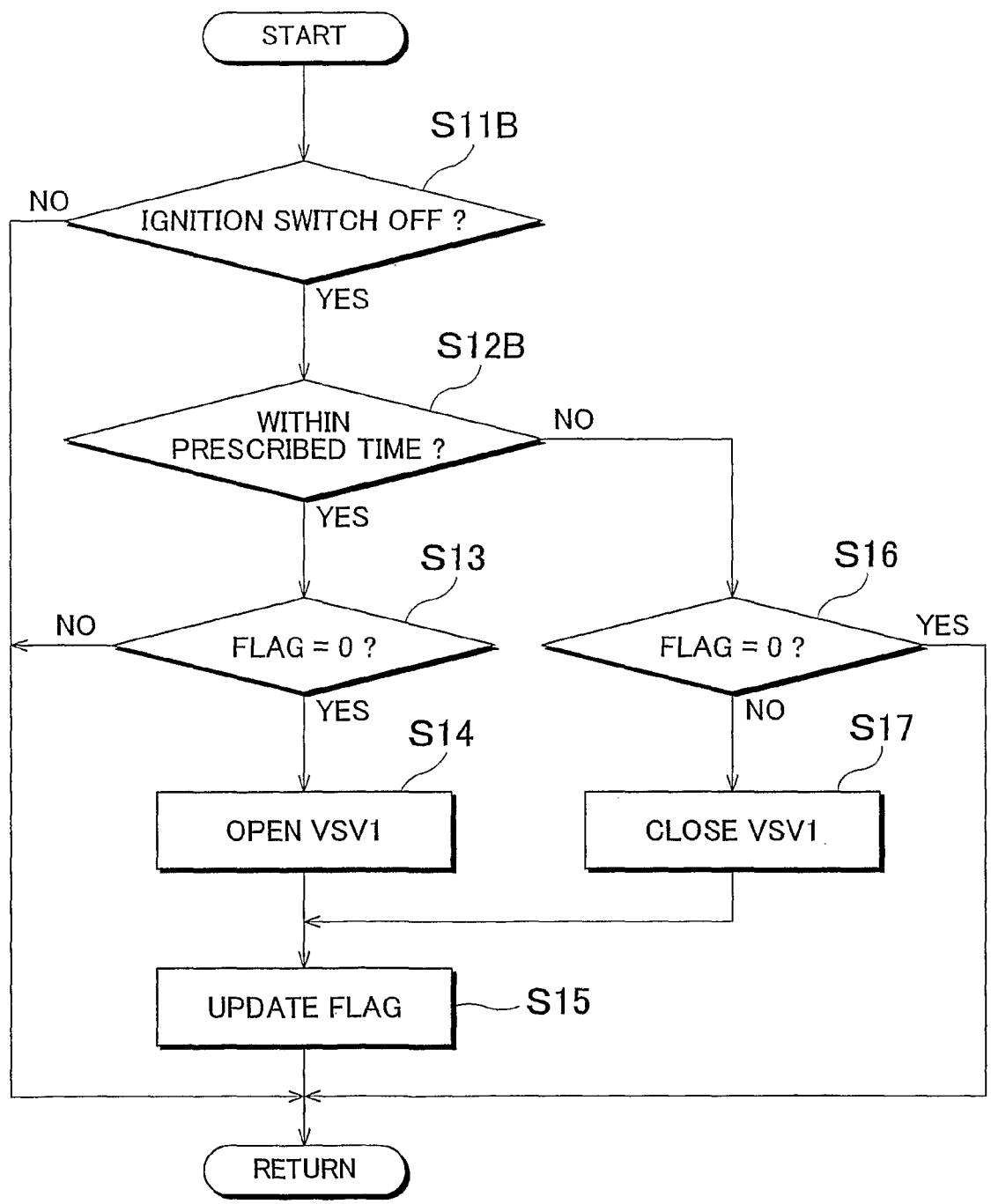
FIG. 4 is a flowchart showing the processes performed by the ECU in causing the ejector to operate, based on the on/off state of an ignition switch.

FIG. 4 is a flowchart showing the process performed by the ECU 40B in operating the ejector 30, based on the on/off state of the ignition switch. The flowchart of FIG. 4 is the same as the flowchart shown in FIG. 3, with the exception that the steps 11A and 12A are replaced by steps 11B and 12B, respectively. For simply describing this process, the steps 11B and 12B will be described in particular detail. The CPU determines whether the ignition switch is off (step 11B). Whether the ignition switch is off is determined using an output signal from the ignition switch on/off detection sensor (not illustrated) connected to the ECU 40B. If an affirmative determination is made at step 11B, the CPU then determines whether the time is within a prescribed time since the ignition switch is turned off (step 12B). The prescribed time is preferably shorter than and close to the amount of time during which power is still supplied from the ignition system to the ECU 40B after the ignition switch is turned off. If the determination is affirmative, after completing step 13, VSV 1 is opened at step 14.

On the other hand, if a negative determination is made at step 12B, the CPU determines whether the flag is 0 (step 16). If the flag is 1, the CPU stops the electrical powering of VSV 1 to close the VSV 1 before the supply of power to the ECU 40B is stopped (step 17). In contrast, if the flag is 0 at step 16, the VSV 1 was closed during the previous execution of this routine, and the CPU again executes the step 11B. By doing this, it is possible to operate the ejector 30 at least until the internal combustion engine 50 comes to a complete stop. That is, it is possible at an early stage and without adversely affecting the air-fuel ratio to allow intake air to flow through the ejector 30, to remove condensed water that has accumulated in the negative pressure generating part 32c and remove deposits occurring on the wall surfaces of the negative pressure generating part 32c. It is therefore possible to inhibit blockage that may be caused by freezing of condensed water and aggravation of blockage that is due to the caking of deposits in the ejector. If internal exhaust gas recirculation (EGR) recirculates exhaust gas in the internal combustion engine 50, it is possible in the ejector system. 100B of this embodiment to force out the exhaust gas that tends to flow back to the intake port after the ignition switch is turned off, by using the intake air flowing in via the ejector 30. In this case, because it is possible to inhibit a decrease in the oxygen concentration in the intake port caused by exhaust gas, it is possible to improve the starting performance of the internal combustion engine 50. By the above, even if there is a time when the ejector 30 is not operated, it is possible to realize an ejector system 100B and an ECU 40B that inhibits blockage of the ejector 30 at low cost and without adversely affecting the air-fuel ratio.

The ejector system 100C according to a third embodiment of the present invention is the same as the ejector system 100A of the first embodiment, with the exception of having an ECU 40C in place of the ECU 40A. The various constituent elements of a vehicle into which the ejector system 100C is applied, with the exception of the ECU 40A, are the same as shown in FIG. 1. In this embodiment, however, the vehicle differs from the first embodiment in that it has, in addition to the internal combustion engine 50, a drive motor (not illustrated) that also serves as a drive power source. Accompanying this difference, the ECU 40C of the third embodiment has a different VSV 1 control program stored in ROM than ECU 40A, and also has, in place of the program for controlling the internal combustion engine 50, a program stored in ROM for hybrid control, this also being different from ECU 40A. The drive motor may be a general type of motor used in a hybrid vehicle.

Figure 5:
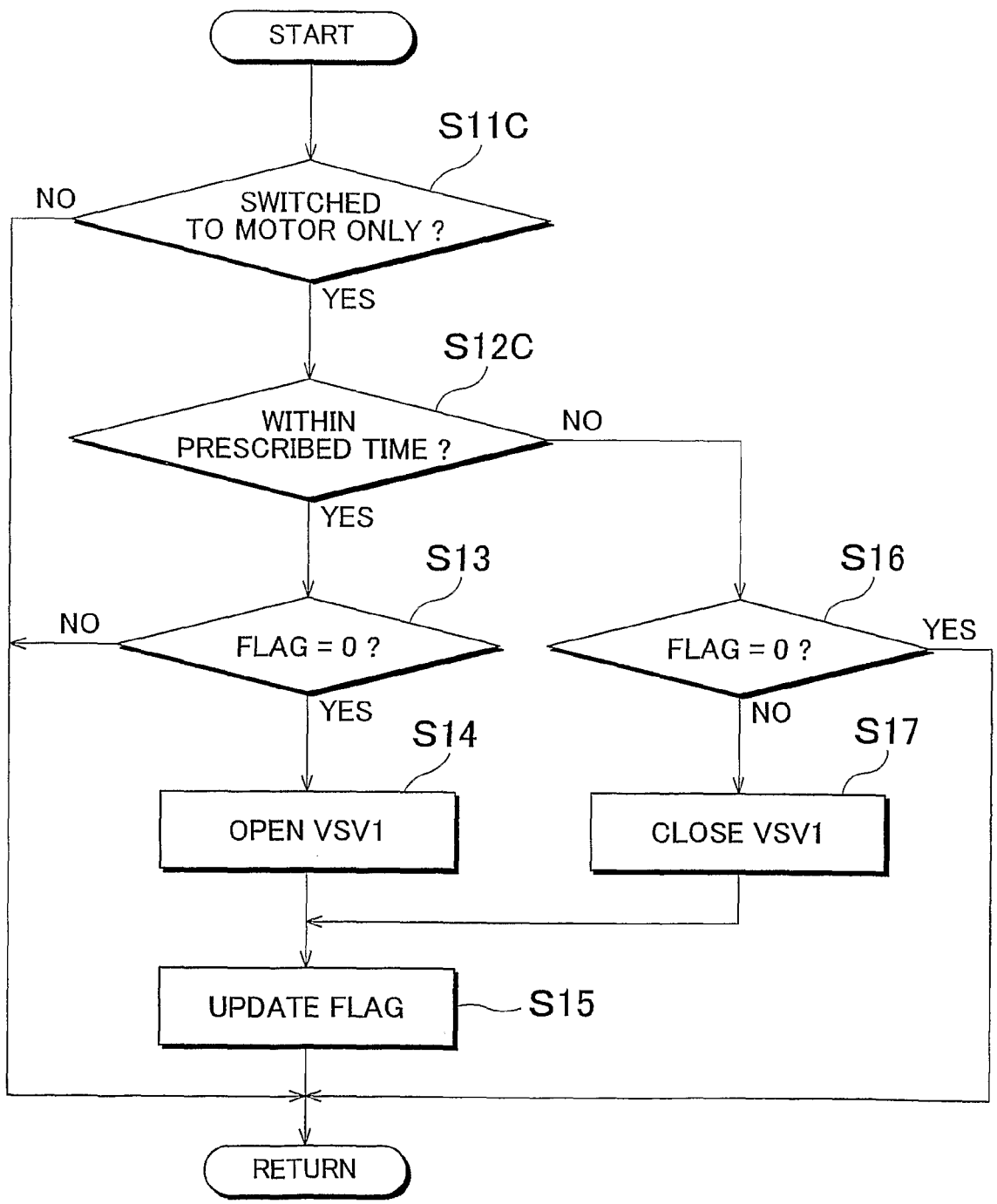
FIG. 5 is a flowchart showing the processes performed in ECU in causing the ejector to operate, based on a use state of the drive power source of a vehicle.

FIG. 5 is a flowchart showing the processes performed by the ECU 40C in operating the ejector 30, based on which drive power source of the vehicle is used. The flowchart of FIG. 5 is the same as the flowchart shown in FIG. 3, with the exception that the steps 11A and 12A are replaced by steps 11C and 12C, respectively. For simply describing the process, steps 11C and 12C will be described in particular detail. The CPU determines whether the drive power source has switched to the drive motor only (step 11C). In order to determine whether the drive power source has switched to the drive motor only, the CPU must verify an internal process state related to hybrid control performed by the ECU 40C. If the determination at step 11C is affirmative, the CPU determines whether the time is within a prescribed time since the drive power source is switched to the drive motor only (step 12C). The prescribed time is preferably longer than and close to the time for the internal combustion engine 50 to come to a complete stop after the drive power source is switched to the drive motor. If the judgment is affirmative, after completing step 13, VSV 1 is opened at step 14.

On the other hand, if a negative determination is made at step 12C, the CPU then determines whether the flag is 0 (step 16). If the flag is 1, the CPU sends a signal to stop the supply of electrical power to VSV 1 to close VSV 1 (step 17). However, if the flag is 0, the VSV 1 was closed during the previous execution of the routine, and the CPU again executes the process shown in step 11C. By doing this, it is possible to operate the ejector 30 until the internal combustion engine 50 comes to a complete stop, even if only the drive motor is being used as the drive power source. That is, it is possible to increase the amount of time to allow the intake air to flow through the ejector 30 without adversely affecting the air-fuel ratio. By the above, even if there is a time when the ejector 30 is not operated, it is possible to realize an ejector system 100C and an ECU 40C that inhibit blockage of the ejector 30 at low cost and without adversely affecting the air-fuel ratio.

Although the above-described embodiments are example embodiments, they are not restrictive, and a variety of other variations are possible as embodiments, within the scope of the spit of the present invention.

The invention claimed is:

1. A vehicle ejector system comprising:
    an ejector that generates a negative pressure that is greater than a negative pressure to be applied from an air intake passage of an intake system, which provides communication between the atmosphere and each cylinder of an internal combustion engine, and that supplies the negative pressure to a brake booster, an operation state changing device that either allows the ejector to operate or stop, and a controller that controls the operation state changing device,
    wherein when fuel is not being injected into the engine in a combustion cycle of the internal combustion engine, the controller controls the operation state changing device to operate the ejector.

2. The ejector system according to claim 1, wherein the operation state changing device is controlled to operate the ejector when a fuel cut control of the internal combustion engine is executed.

3. The ejector system according to claim 2, wherein the operation state changing device is controlled to operate the ejector when a coolant temperature of the internal combustion engine is at or greater than a prescribed value.

4. The ejector system according to claim 3, wherein the prescribed value of the coolant temperature is 70° C.

5. The ejector system according to claim 1, wherein the operation state changing device is controlled to operate the ejector when fuel is being injected into the engine and the coolant temperature of the internal combustion engine is below the prescribed value.

6. The ejector system according to claim 1, wherein the operation state changing device is controlled to operate the ejector when the ignition switch is off and the internal combustion engine is rotating.

7. The ejector system according to claim 1, wherein the internal combustion engine is mounted in a hybrid vehicle that uses an electric motor as well as the internal combustion engine as a drive power source, and the operation state changing device is controlled to operate the ejector when the drive power source is switched from the internal combustion engine to the electric motor.

8. The ejector system according to claim 1, wherein the operation state changing device is an electromagnetic valve, disposed in a bypass that connects the intake passage to the ejector, that connects and blocks the bypass.

9. The ejector system according to claim 8, wherein the electromagnetic valve is a solenoid valve.

10. A vehicle ejector system controller that controls a vehicle ejector system having an ejector that generates a negative pressure that is greater than the negative pressure to be applied from an air intake passage of an intake system, which provides communication between the atmosphere and each cylinder of an internal combustion engine, and that supplies the negative pressure to a brake booster and an operation state changing device that either allows the ejector to operate or stop, comprising:
    a controlling portion to control the operation state changing device to operate the ejector when fuel is not injected in a combustion cycle of the internal combustion engine.

11. The controller according to claim 10, the operation state changing device is controlled to operate the ejector when a fuel cut control is executed in the internal combustion engine.

12. The controller according to claim 11, wherein the operation state changing device is controlled to operate the ejector when a coolant temperature of the internal combustion engine is at or greater than a prescribed value.

13. The controller according to claim 12, wherein the prescribed value of the coolant temperature is 70° C.

14. The controller according to claim 10, wherein the operation state changing device is controlled to operate the ejector when fuel is being injected into the engine and the coolant temperature of the internal combustion engine is below the prescribed value.

15. The controller according to claim 10, the operation state changing device is controlled to operate the ejector when the ignition switch is off and the internal combustion engine is rotating.

16. The controller according to claim 10, wherein the internal combustion engine is mounted in a hybrid vehicle that uses an electric motor as well as the internal combustion engine as a drive power source, and the operation state changing device is controlled to operate the ejector when the drive power source is switched from the internal combustion engine to the electric motor.

17. A vehicle ejector system controller that controls a vehicle ejector system having an ejector that generates a negative pressure that is greater than a negative pressure to be applied from an air intake passage of an intake system, which provides communication between the atmosphere and each cylinder of an internal combustion engine, and that supplies the negative pressure to a brake booster and an operation state changing device that either allows the ejector to operate or stop, comprising:
    means for controlling the operation state changing device to operate the ejector when fuel is not injected in a combustion cycle of the internal combustion engine.

* * * * *